STEPHEN W. WOOD.

Breech-Loading Fire-Arms.

No. 4,842.

Reissued April 2, 1872.

Witnesses.
C. M. Gallaher.
J. S. Brown.

Stephen W. Wood
Inventor

AM. PHOTO-LITHOGRAPHIC CO. N.Y. (OSBORNE'S PROCESS.)

3 Sheets--Sheet 2.

STEPHEN W. WOOD.

Breech-Loading Fire-Arms.

No. 4,842.

Reissued April 2, 1872.

Witnesses.
E. M. Gallaher
J. S. Brown.

Stephen W. Wood
Inventor

AM. PHOTO-LITHOGRAPHIC CO. N.Y. (OSBORNE'S PROCESS.)

STEPHEN W. WOOD.

Improvement in Breech-Loading Fire-Arms.

No. 4,842. Reissued April 2, 1872.

Witnesses
E. M. Gallaher
A. S. Brown

Inventor
S. W. Wood

AM. PHOTO-LITHOGRAPHIC CO. N.Y. (OSBORNE'S PROCESS.)

UNITED STATES PATENT OFFICE.

STEPHEN W. WOOD, OF CORNWALL, NEW YORK.

IMPROVEMENT IN BREECH-LOADING FIRE-ARMS.

Specification forming part of Letters Patent No. 34,854, dated April 1, 1862; reissue No. 4,842, dated April 2, 1872.

*To all whom it may concern:*

Be it known that I, STEPHEN W. WOOD, of Cornwall, in the county of Orange and State of New York, have invented new and useful Improvements in Breech-Loading Fire-Arms; and I do hereby declare that the following is a full and exact description thereof, reference being had to the accompanying drawing making part of this specification—

Figure 1:
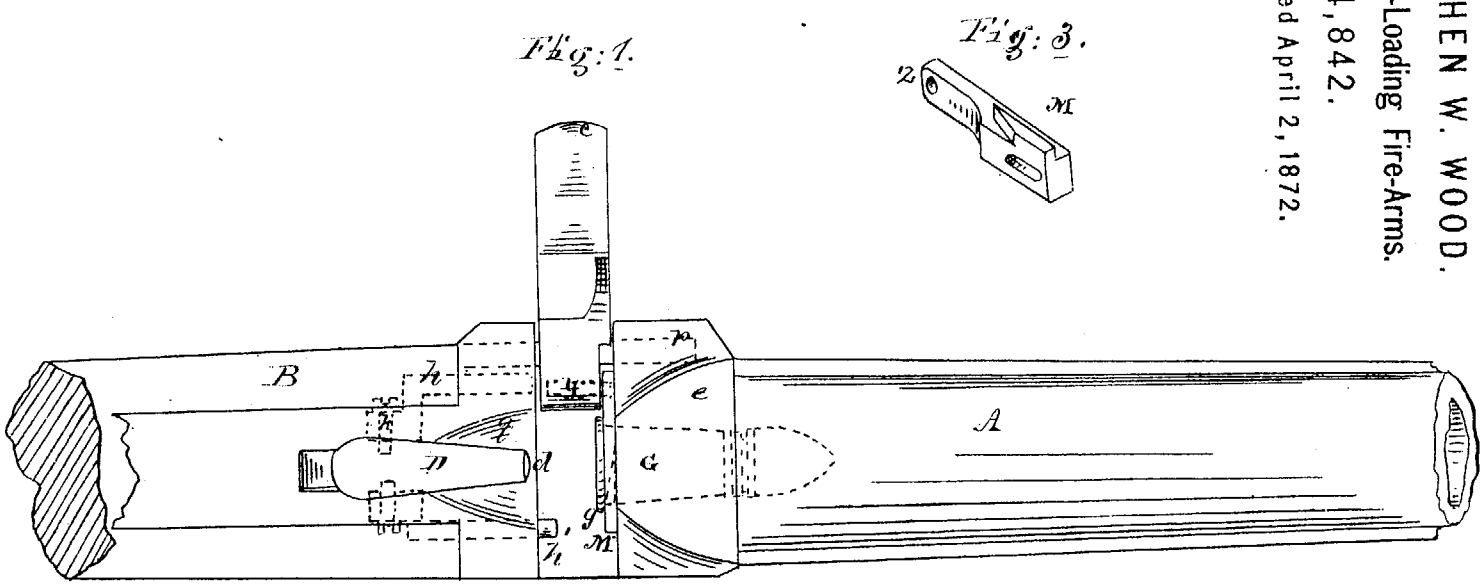
Figure 2:
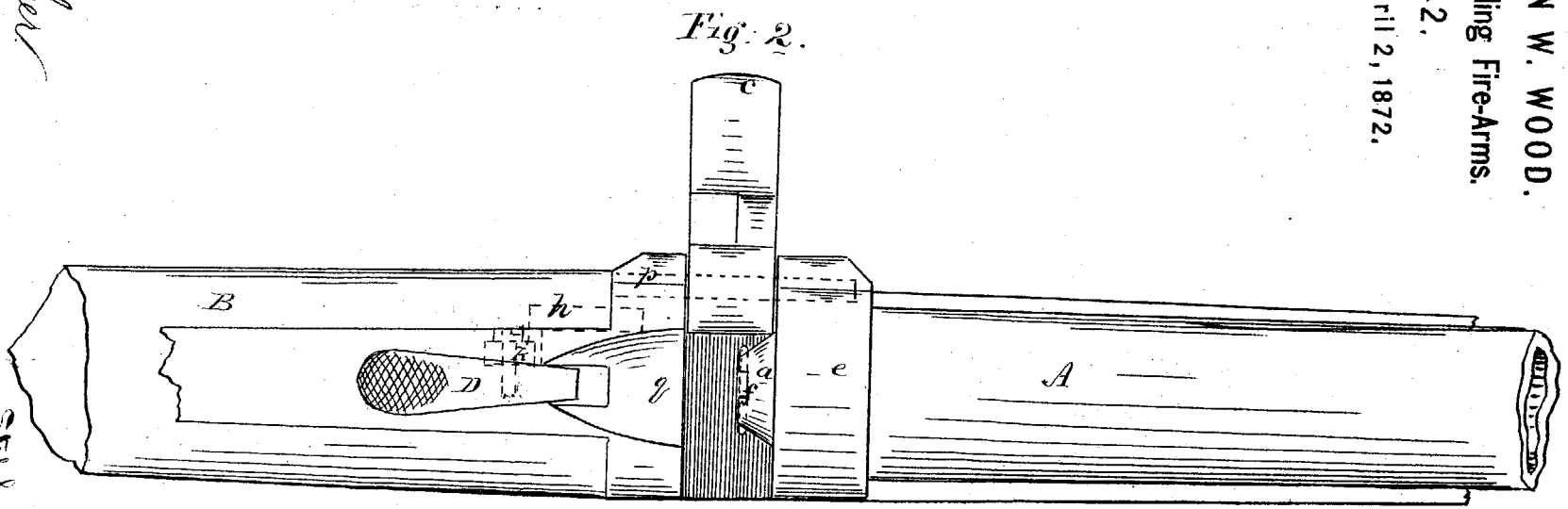
Figure 8:
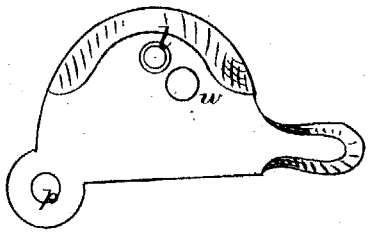
Figure 9:
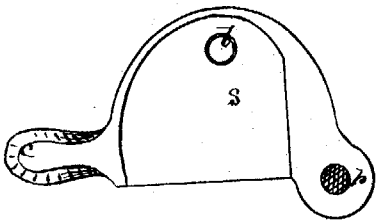

Figure 1 being a top view of a portion of a breech-loading fire-arm, provided with my improvements, sufficient to represent the invention; Fig. 2, a top view, showing a modification in the arrangement of some of the parts; Fig. 3, a perspective view of the wedge-shaped slide or piece, employed to start and partially withdraw the metallic cartridge-cases from the chamber or barrel; Figs. 4, 5, 6, and 7, respectively, rear perspective view, rear elevation, front perspective view, and front elevation of the gate; Figs. 8 and 9, respectively, rear and front views of the gate, provided with a sliding pin or bolt, as an intermediate means of exploding the cartridges.

Like letters designate corresponding parts in all of the figures.

The main parts of the fire-arm are designated as the barrel A, the stock B, the gate C, the hammer D, and the breech-piece E. The barrel A, the stock B, and the hammer D fulfill the usual purposes indicated by their names. The gate C is the movable part, which opens to allow the cartridge to be inserted into the breech-chamber of the barrel, and is shut again to inclose the cartridge till the discharge takes place. The breech-piece E serves to unite the barrel and stock, and to mount the gate, hammer, and lock upon.

There may be nothing peculiar in the construction of the barrel, except when its rear end *a* projects backward into the gate-way; nor of the stock B, nor of the hammer D, except in its face *d*; nor of the breech-piece E, except in the form of the band *e*, in the modification to be described.

The cartridge G, to be used with this fire-arm, has a metallic case (generally of copper) which, by its expansion, at the explosion of the charge, prevents any leakage of gas, and which contains the fulminate, requiring only a blow of the hammer against the case to explode it. The case has an enlarged rim or head, *g*, at the rear or closed end, which may hold the fulminate, and which serves to seize, for withdrawing the empty case after the charge has been fired. I make the cartridge-case slightly conical or tapering, to fit a corresponding shape of the chamber or bore, in the rear end of the barrel, as indicated in Fig. 1, so that the case can be readily inserted, may fit more closely, and be more easily started out and withdrawn after the discharge. The gate C is hinged at *p*, in one side of the breech-piece E, and closes into a transverse notch in said breech-piece immediately behind the rear end of the barrel A, so as to close the notch and rear end of the barrel for the discharge. A knob, *c*, projects from the gate, to handle it by. The breech-piece is hollowed at *g*, behind the gate-notch, to allow the free insertion of the cartridges into the rear end of the barrel. A notch, *r*, is made in the top of the gate sufficient to expose a small portion of the rim or head of the cartridge-case, and allow the face of the hammer to reach the same and explode the charge. But when, as in Figs. 1, 8, and 9, an intermediate pin or bolt, *l*, is located in the gate, the hammer strikes the rear end thereof, and forces the front end of the same against the cartridge and thereby effects the explosion. The pin may be drawn back into position by a spring or by positive motion in raising the hammer.

In order that the case of the exploded cartridge may be caught hold of and withdrawn easily by the fingers, the rear end *a* of the barrel A may project backward somewhat into the gate-notch of the breech-piece; and this projecting portion is beveled, notched, hollowed, or otherwise shaped, in a manner equivalent, as in Fig. 2, so that the rim of the cartridge-case may be caught at the sides by the fingers, to draw it out. But a surer and better mode of withdrawing the cartridge-case is by means of a wedge or wedge-acting piece, M, to which a sliding movement is given, so as to act behind the rim of the case, and loosen it in as well as partially withdraw it from the tapering barrel, and in consequence of said taper the cartridge will either drop or may be readily removed therefrom. The arrangement of the wedge may be made in the gate-notch, as indicated in Fig. 1, and be operated by the gate for the purpose. It is forced between the rim of the cartridge-case and the end or face of the barrel by means of a pin, *y*, projecting from the front side of the gate C, entering an aperture, *z*, near the end of said slide, in opening the gate and withdrawn therefrom by closing the gate.

In connection with the projection of the barrel into the gate-notch of the breech-piece, the front face of the gate is countersunk or hollowed, as seen at *s*, in several of the figures, so as to admit and inclose the said projection, together with the cartridge-head, the bottom of the countersink shutting down just behind the same. Instead of the rear end of the barrel extending into the gate-notch and being beveled, the band *e* of the breech-piece may be thus beveled, notched, hollowed, or countersunk, to allow the cartridge-case to be caught hold of and withdrawn. The rear end of the barrel also is countersunk sufficiently to allow the head or rim *g* of the cartridge-case to enter just inside of the rear surface of the barrel or chamber, as seen in Fig. 2, in order to enable the projecting lip, or part of the barrel thereby formed, to protect the cartridge from the closing gate, and thus prevent any liability of premature explosion by that cause. The band *e* may be countersunk to perform the same office of protecting the cartridge, if preferred.

The hammer D is mounted centrally in the stock, and is actuated by a main spring, connecting-link, trigger, and trigger-spring, which, together, constitute the whole gun-lock. For the purpose of preventing the descent of the hammer upon the cartridge, when the gate is open, a safety-bolt, *h*, Figs. 1 and 2, is employed, substantially as follows: It slides in the breech-piece behind the hinged end of the gate, the position being such that its front end bears against the rear face of the gate, in whatever position the gate may be, except when fully closed, and in the latter case the bolt may enter an aperture, *i*, in the gate. The bolt *h* is directly connected with the hammer D, by means of a pin, *k*, projecting from the side of the said hammer through a slot in the bolt, or by other equivalent means, so that the bolt must have a certain extent of forward motion as the hammer descends. The length and position of the bolt are such that the hammer can only partly descend before the bolt strikes the gate, and prevents the possibility of the hammer's reaching the cartridge while the gate is open or partly open. As soon as the gate is closed the aperture *i* is brought opposite to the safety-bolt, which then may enter N, and thus allow the hammer to descend upon the cartridge.

Figure 6:
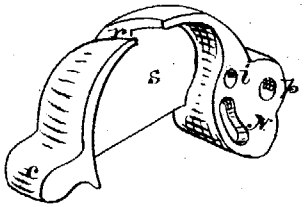
Figure 7:
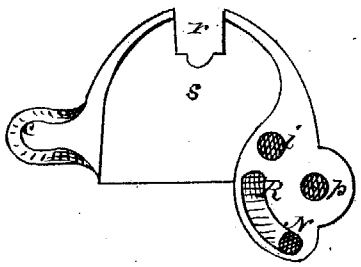
Figure 4:
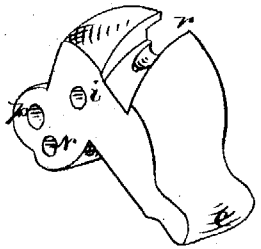
Figure 5:
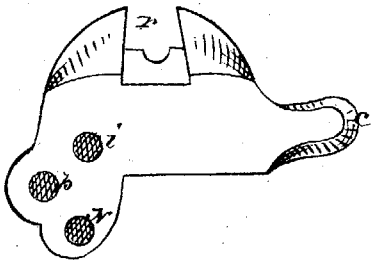

The two bolts may be arranged, as seen in Fig. 1, one bolt bearing against the face of the gate, while the other projects into the gate-notch, thereby preventing the gate's being closed until the hammer is at least at half-cock, thus withdrawing the second bolt *h'* within the rear face of the gate-notch. Any arrangement of the bolt or bolts different from that described, or any modification thereof, accomplishing the same result by the same means is considered by me the equivalent thereof. In addition to the safety-bolt, to secure against the possibility of premature explosion, the hammer, even when held back by the safety-bolt, should not be at less than half-cock, as the gate is finally closed. Otherwise, then the hammer would descend to the cartridge at once. To provide against this the face *d* of the hammer may be made of such length in relation to the safety-bolt that as long as at less than half-cock it will extend further forward than the rear face of the gate, when the safety-bolt bears against the same. Thus, while the hammer is in that position of insecurity the gate cannot be closed, and the hammer must be brought at least to half-cock before the gate can descend; or, to prevent closing the gate when the hammer is less than at half-cock a countersink, N, as seen in Figs. 6 and 7, may be made in the face of the gate, to receive the end of the safety-bolt, the length and motion of the safety-bolt being such that the hammer must be at least at half-cock to withdraw it from the countersink to allow the gate to close—an elongated groove or countersink, R, Fig. 7, receiving the bolt, and allowing limited motion back and forth to the gate, but not permitting it to be closed until the hammer is at least at half-cock, and the pin withdrawn from the groove may be substituted if desired.

What I claim as my invention, and desire to secure by Letters Patent, is—

1. A countersink in the front face of the gate, so as to admit and inclose the rear projecting end of the barrel and the cartridge, for the purpose herein specified.

2. The safety-bolt *h*, in combination with the hammer D and gate, provided with the aperture *i*, all substantially as and for the purpose herein specified.

3. A wedge or wedge-acting piece, in combination with the gate, for the purpose of starting the case of the exploded cartridge from the barrel or chamber, substantially as herein specified.

4. In breech-loading fire-arms, the combination of a tapering chamber or cartridge-seat, a breech-opening and closing-gate, and a wedge operated directly by the gate, in the act of opening the breech for starting the cartridge from the chamber.

STEPHEN W. WOOD.

Witnesses:
JOS. BROWN,
E. M. GALLAHER.